(12) United States Patent
Sikharulidze et al.

(10) Patent No.: US 8,054,535 B2
(45) Date of Patent: Nov. 8, 2011

(54) ELECTROPHORETIC DISPLAY DEVICE

(75) Inventors: David Sikharulidze, Bristol (GB);
Laura Kramer, Corvallis, OR (US);
Gregg Combs, Monmouth, OR (US);
Jeff Mabeck, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/865,255

(22) PCT Filed: Feb. 26, 2008

(86) PCT No.: PCT/US2008/054960
§ 371 (c)(1),
(2), (4) Date: Jul. 29, 2010

(87) PCT Pub. No.: WO2009/108187
PCT Pub. Date: Sep. 3, 2009

(65) Prior Publication Data
US 2010/0328758 A1    Dec. 30, 2010

(51) Int. Cl.
*G02B 26/00*   (2006.01)
(52) U.S. Cl. .................................... 359/296; 359/295
(58) Field of Classification Search ............ 359/296
See application file for complete search history.

(56) References Cited

U.S. PATENT DOCUMENTS

| 5,269,840 | A  | * | 12/1993 | Morris et al. ............... 106/437 |
| 6,621,541 | B1 | * | 9/2003  | Choi ........................... 349/113 |
| 2001/0040651 | A1 |   | 11/2001 | Toko |
| 2004/0263947 | A1 | * | 12/2004 | Drzaic et al. ............... 359/296 |
| 2005/0094087 | A1 | * | 5/2005  | Sikharulidze ............... 349/167 |
| 2006/0007529 | A1 | * | 1/2006  | Mizuno ....................... 359/296 |
| 2008/0042928 | A1 | * | 2/2008  | Schlangen et al. .......... 345/55 |

FOREIGN PATENT DOCUMENTS
EP    1016895 A1    7/2000

OTHER PUBLICATIONS
European Search Report dated Apr. 7, 2011 for European Application No. 08730710.4.

* cited by examiner

*Primary Examiner* — Ricky Mack
*Assistant Examiner* — James Jones

(57) ABSTRACT

A multi-stable electrophoretic display device has a plurality of pixels and comprises a first substrate and a second substrate. The substrates are spaced apart from each other and enclose a layer of an electrophoretic medium comprising a liquid crystal material having finely divided pigment particles dispersed therein. The device further comprises electrodes for formation of a pixel area outline and applying an electric field across at least some of the electrophoretic medium in the pixel area. The electrodes occupy substantially less than the entire field of view of the display pixels and can be used to effect switching between a first optical state in which most incident light on a pixel does not impinge on a pigment particle, and a second optical state in which most incident light on a pixel impinges on pigment particles.

22 Claims, 11 Drawing Sheets

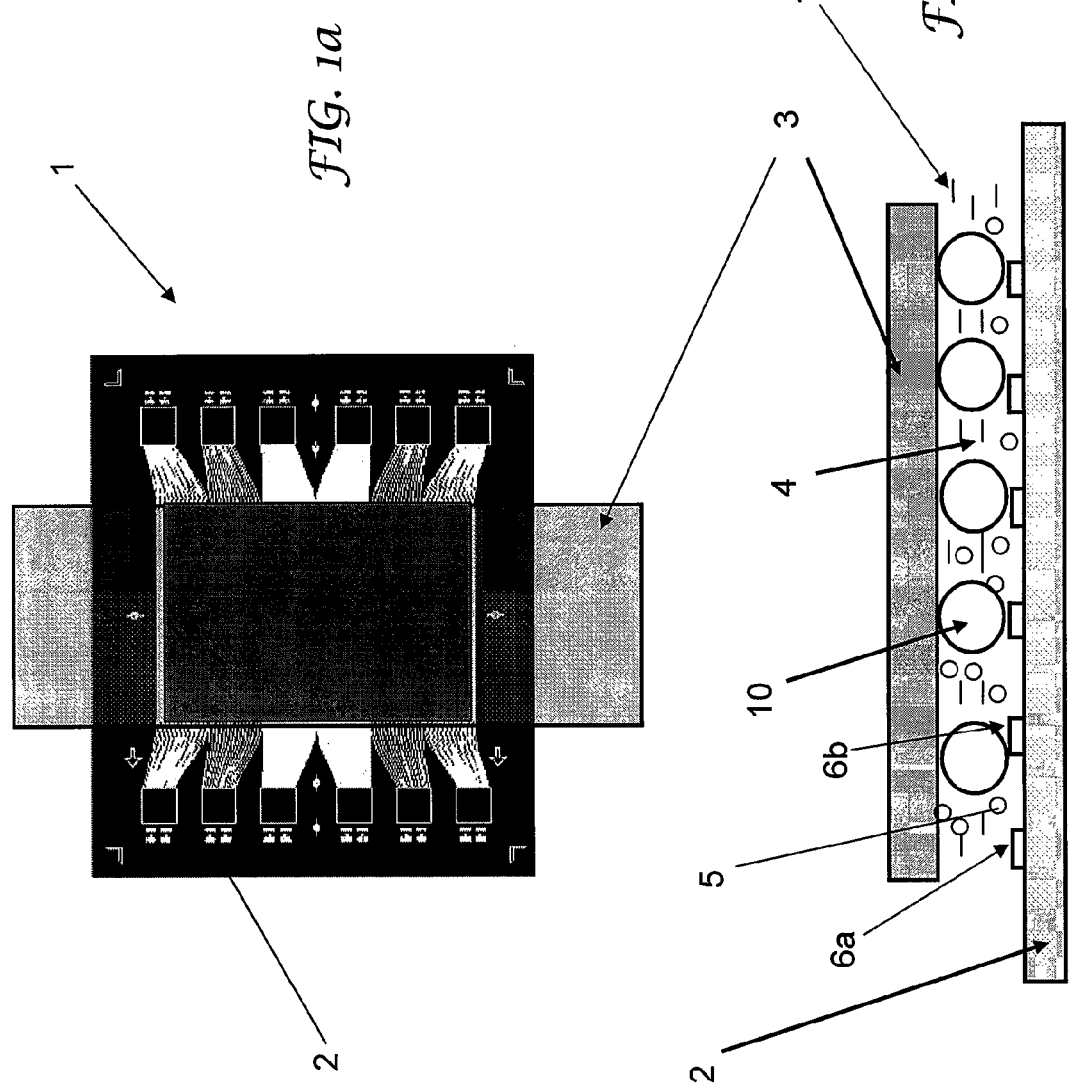

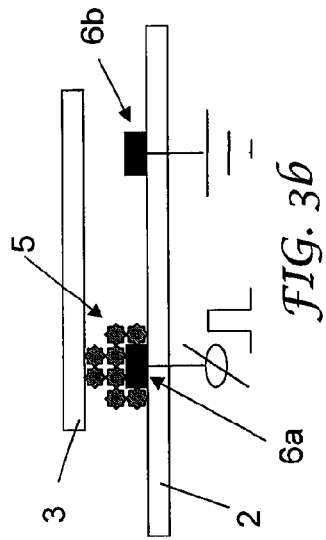
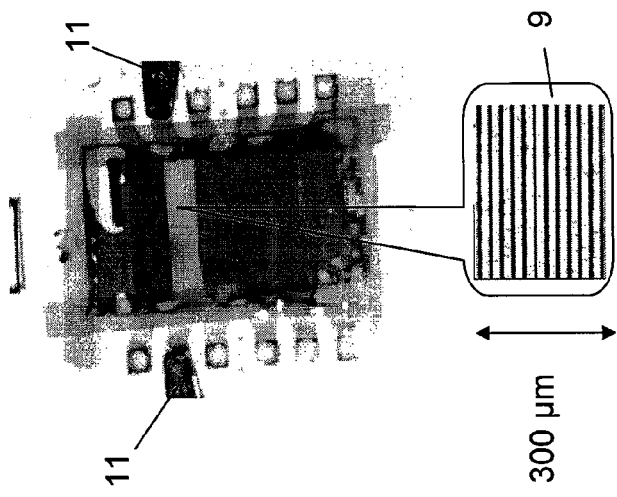
FIG. 3a
FIG. 4a
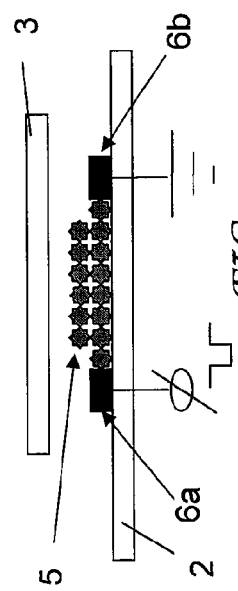
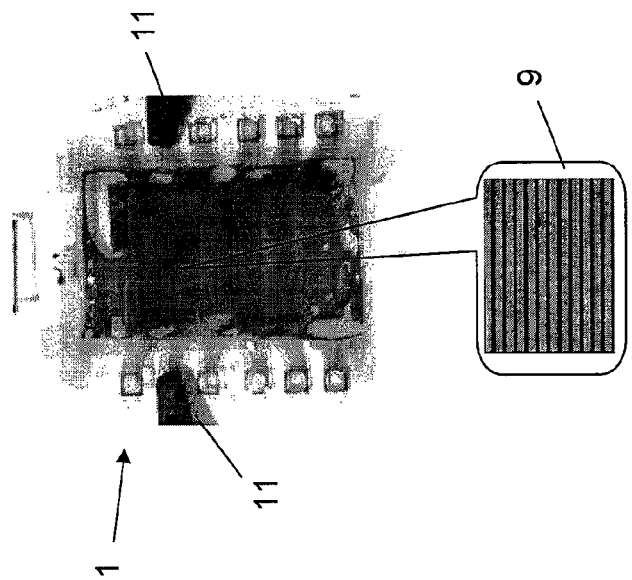
FIG. 3b
FIG. 4b

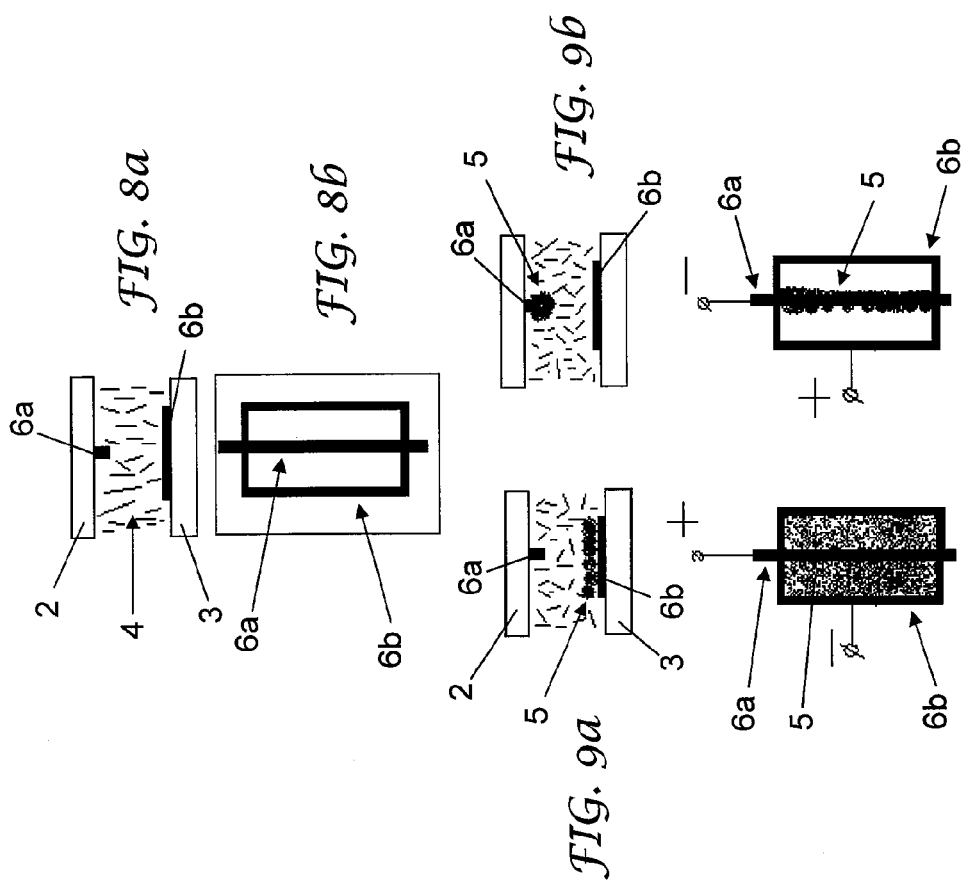

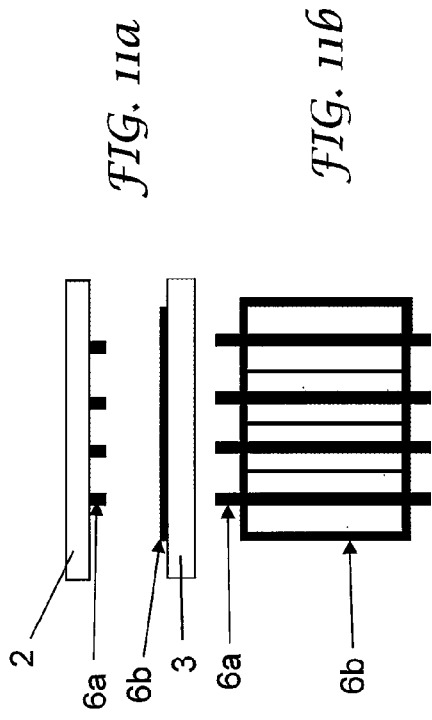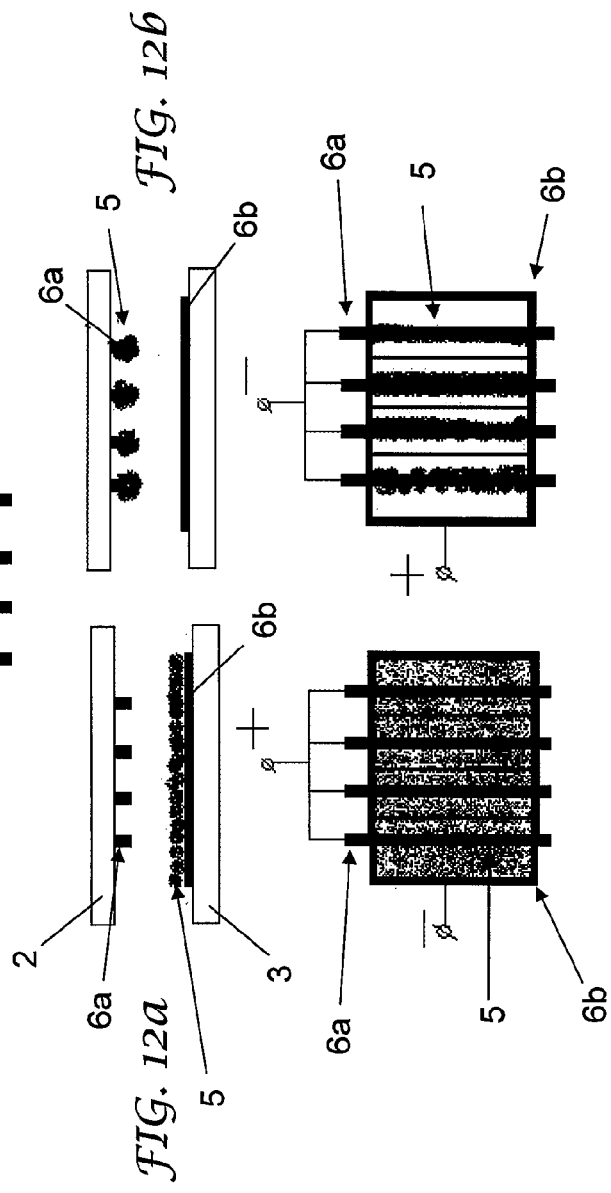

ELECTROPHORETIC DISPLAY DEVICE

The present invention relates to an electrophoretic display device.

Electrophoretic display devices typically comprise a pair of opposed substrates provided with transparent electrode patterns on their inner surfaces. Sandwiched between the substrates is a non-conductive liquid in which is dispersed highly scattering or absorbing microparticles. The microparticles become electrically charged, and can be reversibly attracted to the top or lower surface of the display by application of a suitable electrical field across the electrode structures. The optical contrast is achieved by contrasting of colours of the microparticles with dye doped liquids or by contrasting colours of oppositely charged dual microparticles, suspended in a transparent liquid. A problem with such displays is that they lack threshold, i.e. the particles begin to move at a low voltage, and move faster as a higher voltage is applied. This makes the technology unsuitable for passive matrix addressing which require a relatively sharp threshold to reduce crosstalk.

Conventional electrophoretic displays also are typically slow to switch, making them unsuitable for applications requiring fast switching, such as video displays.

In US 2005/0094087, which is owned by the present assignee and the contents of which are hereby incorporated by reference in their entirety, a bistable electrophoretic liquid crystal display is described, which allows switching with threshold and video rate. This uses overlapping transparent row-column electrodes on separate substrates which enable matrix addressing.

Conventional electrophoretic displays are configured with the opposing electrodes being arranged vertically with one being an upper electrode and one being a lower electrode with respect to the display surface of the display device. In such displays, with vertical particle motion between the electrodes, the pixel is defined by the area of transparent electrodes, via which an electric field is applied to the pixel.

Transparent electrodes attenuate transmitted light, which limits the peak brightness of the display. The transparent electrodes also have high resistivity, which can limit the size of a simple passively addressed display. The brightness of electrophoretic displays can be improved by the use of in-plane electrodes, for example provided by two strip electrodes on the same substrate, between which the pigments move horizontally under an applied electric field. In such construction the liquid medium is transparent, without a dye, and provides a good stability of the mixture with suspended pigments. US 2005/0275933 describes such an electrophoretic device, which has a substrate with in-plane electrodes and an opposite substrate which is free of electrodes. Simple passive matrix addressing is difficult to achieve for a device of this construction.

U.S. Pat. No. 4,648,956 describes an electrophoretic display in which one substrate has single pixel transparent display electrodes and the opposite substrate has strip collecting electrodes. Under an applied voltage the pigments cover the whole pixel area with transparent single display electrodes and the device is in an OFF state. Applying a suitable different voltage causes collection of the pigments on the strip collecting electrodes on the opposite side in such a manner that the spacing between the strip electrodes is transparent. The light passes through the pixel, and accordingly this determines the device's ON state.

The transparent conductive layer of the display pixels reduces transmittance of the display and the resistivity limits passive matrix addressing of large area displays.

SUMMARY OF THE INVENTION

Aspects of the invention are specified in the independent claims. Preferred features are specified in the dependent claims.

The invention provides an electrophoretic display device which is multi-stable and which has a threshold voltage. A bistable device is the simplest example of a multi-stable device. The principles described in the present specification can be applied to both bistable and multi-stable display devices.

The device may be driven by a simple passive matrix scheme. The metal electrodes may be in the form of fine wires which provide adequate conductivity for large areas displays and which occupy little area, providing high light transmittance. The liquid crystal with suspended pigments allows multi-stable switching with threshold, which gives a possibility of passive matrix addressing.

In one embodiment the display is suitable for operation in a transmissive mode, with transparent colour pigments. This gives a possibility of building a full colour display, by stacking 2 or 3 display layers with suitable transparent colour pigments.

BRIEF DESCRIPTION OF THE DRAWINGS

The invention will now be further described, by way of example only, with reference to the following drawings in which:

FIG. 1 shows a plan view and a schematic sectional view through a device in accordance with a first embodiment of the invention;

FIG. 3 shows schematic sectional views of a device in accordance with the embodiment of FIG. 1, in different optical states;

FIG. 4 shows photographs of a test device in accordance with the embodiment of FIG. 1;

FIG. 8 shows schematic sectional and plan views of a device in accordance with a fourth embodiment of the invention;

FIG. 9 is a schematic sectional view of the device of FIG. 8 in a dark state and in a light state;

FIG. 10 shows schematic plan views of the device of FIG. 9;

FIGS. 11-13 show views of a device in accordance with a sixth embodiment of the invention;

DETAILED DESCRIPTION

Figures 2A, 2B:
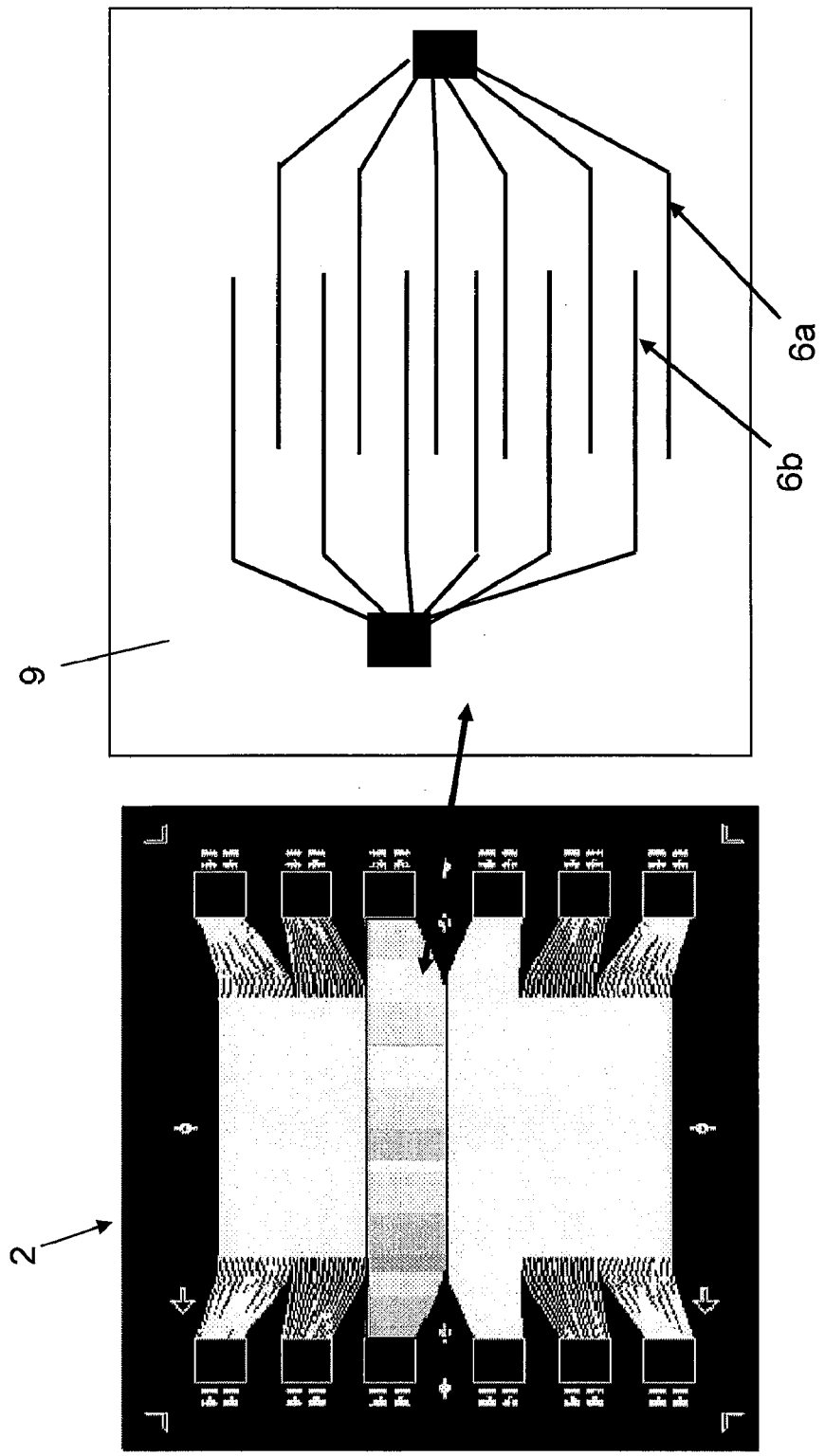
FIG. 2 shows plan views of part of a first substrate of the device of FIG. 1.

As used in the present specification and in the appended claims, the term "multi-stable" or "multi-stability" refers to the property of a cell of an electrophoretic display to be stable in any of many optical states. With multi-stability, the charged particles will remain wherever they are, even somewhere in between the two electrodes, in the absence of an electric field between the electrodes causing further migration.

Consequently, a pixel may retain a state in which some of the charged particles are in view and some are not, giving the pixel a color somewhere between that when all or none of the particles are in view.

Thus, multi-stability allows the cells or pixels of the electrophoretic display to take on any of a number of intermediate shades or colors thus allowing the image to be displayed in grayscale. The principles described in the present specification can be applied to both bistable and multi-stable display devices.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative systems and methods.

The multistable electrophoretic display device 1 of FIG. 1 comprises a first substrate 2 and a second substrate 3. The substrates 2,3 are spaced apart from each other and enclose a layer of an electrophoretic medium 4 comprising a liquid crystal material 13 having finely divided pigment particles 5 dispersed in it.

First electrodes 6a and second electrodes 6b are provided on an inner surface of the first substrate 2 for applying an electric field across at least some of the electrophoretic medium 4. The second substrate 3 does not carry an electrode, so that its light transmissivity is high. As best shown in FIG. 2, the first electrodes 6a are interdigitated with the second electrodes 6b on the first substrate 2. Although first and second electrodes are shown by way of illustration, it will be understood that the invention is not limited to two electrodes per pixel. Three or more electrodes may optionally be used.

The display 1 in this example is made up of several segments 9 each of which carries a set of interdigitated electrodes 6a,6b that define a pixel. The electrodes 6 in this example (30 µm spaces) were formed with 10 µm width metal lines on the first substrate 2 formed from a plastics material. The second substrate 3 was a bare plastics sheet, spaced from the first substrate 2 by spacers 10. In this example the spacers 10 comprised 10 µm spacer beads; however other types of spacer known in the art could be used, for example threads or wires, or moulded, embossed or cast features such as pillars or posts. The electrophoretic medium 4 comprised a nematic liquid crystal mixture (MLC-6681—Merck) with suspended transparent blue pigments Hostaperm Blue B2G-D with size 87 nm (Clariant) and 2% of 10 µm spacer beads. The pigment particles acquire a negative charge in the LC.

The substrates were provided with alignment layers. In this example the substrates were treated with a chrome complex solution; however other types of surface treatments can be used for providing appropriate interaction of liquid crystal molecules and pigment particles with the surface. Alignment layers or structures known in the art may be used, for example gratings, microstructures, evaporated silicon monoxide or a surface active agent such as lecithin. Writing to the light state (FIG. 4b) was done using 60 V pulses (100 ms) and writing to the dark state (FIG. 4a) was achieved using −60 V pulses (60-80 ms).

The electrodes 6 occupy substantially less than the entire field of view of the display and can be used to effect switching between a first optical state (FIG. 3a) and a second optical state (FIG. 3b). In the first (dark) optical state, most incident light that passes through the first substrate 2 is absorbed by the pigment particles 5. In the second (light) optical state, most incident light that passes through the first substrate 2 impinges on the second substrate 3 and does not impinge on a pigment particle 5.

A fringing electric field will cover the space between the two in-plane electrodes 6a,6b. Consequently the molecules' dipole, which provides charging of the pigment particles, will also be oriented along the fringe field lines. Switching is via in-plane electric fields which move the particles in and out of the main field of view. Accordingly the pigment particles will be forced to migrate in this direction due to their interaction with the oriented LC molecules. A suitable voltage pulse provides movement of pigment particles 5 towards the line electrode 6a (FIG. 3b) where the pigment particles are collected, or in the space between line electrodes 6a,6b (FIG. 3a) At zero field the pigments will be locked in the area between electrodes, due to interaction of the LC with the pigment particles 5, providing a stable network of LC/pigment particles. Because of this the device enables bistable switching without stacking of the pigment particles 5 on flat, broad electrodes.

To spread the pigments 5 between electrodes 6a,6b, the electrical pulse should have a length and/or amplitude which is not enough to produce full migration of pigments between electrodes. Such switching can be controlled by variation in pulse length or voltage, which is linked with electromigration distance by the following equation:

$$t = d^2/\mu U$$

where t is the drifting time between electrodes, U is applied voltage, d is the spacing between electrodes, and µ is the electrophoretic mobility.

By dispersing the pigment particles 5 in a liquid crystal medium, in this example a nematic liquid crystal, the display is made bistable and has a threshold voltage. Switching is via in-plane electric fields which move the particles in and out of the main field of view. For improved threshold voltage characteristics and switching speed, it is preferred that the liquid crystal material have a dielectric anisotropy which is greater than about +2 or less than about −2.

Experimental mixtures have been made for use as the electrophoretic medium 4 using transparent coloured pigment particles 5 (Clariant) and 10 µm spacer beads 10. Formulations were:
1. MLC6681 nematic LC (Merck) +3% Hostaperm pigment Blue B2G-D (negative charge);
2. MCL6681+3% Hostaperm pigment Pink E02 (positive charge);
3. MLC6681+3% Novaperm pigment Yellow 4G (negative charge).

A full colour transmissive display can be realised by stacking such CMY cells with transparent pigments.

Figure 5B:
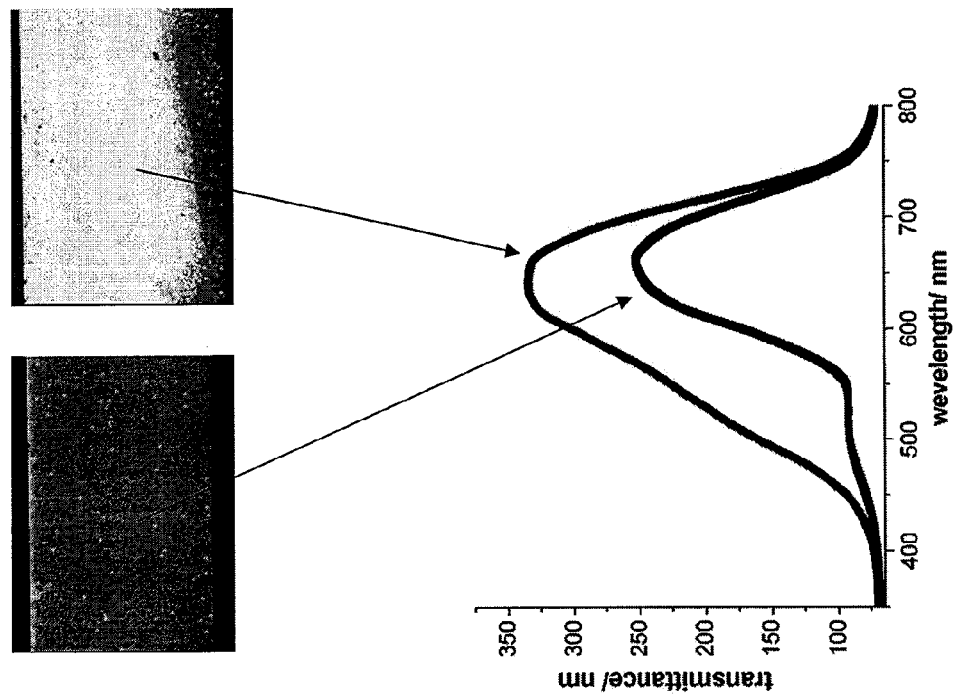
FIG. 5 shows graphs of transmittance for different optical states of devices in accordance with the embodiment of FIG. 1.
Figure 5A:
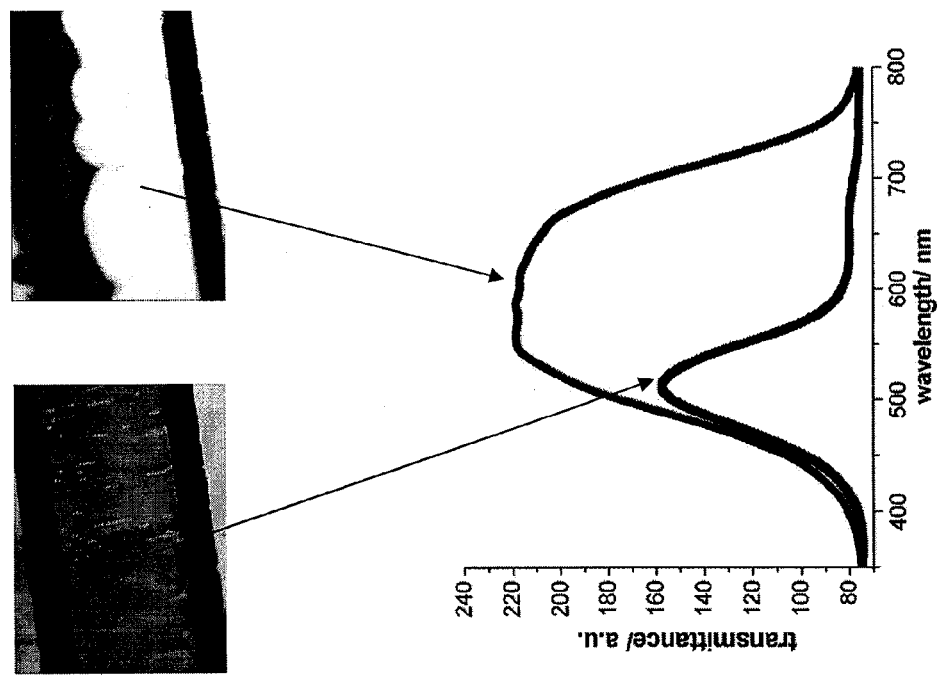

FIG. 5 shows the transmittance spectral measurement of switched states of the pixel, provided in two in-plane cells. One device was filled with liquid crystal MLC6681, containing transparent pigment Hostaperm Blue B2G-D (FIG. 5a) and the other was filled with MLC6881 containing Hostaperm Pink E02 (FIG. 5b).

Figure 6A:
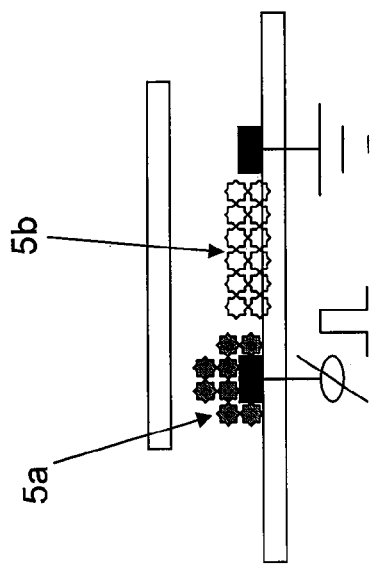
FIGS. 6 and 7 are schematic sectional views of devices in accordance with second and third embodiments of the invention.
Figure 6B:
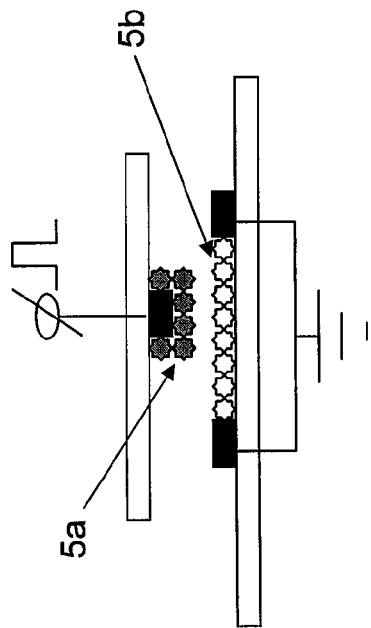
Figure 7A:
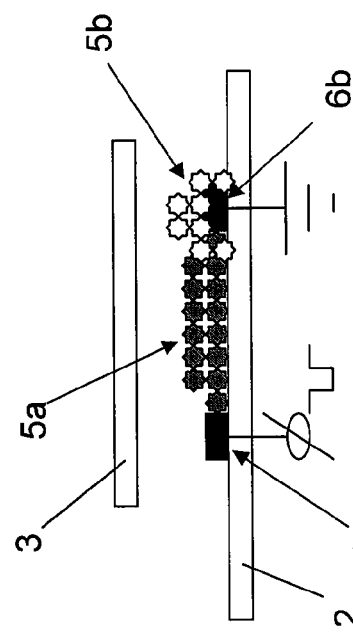
Figure 7B:
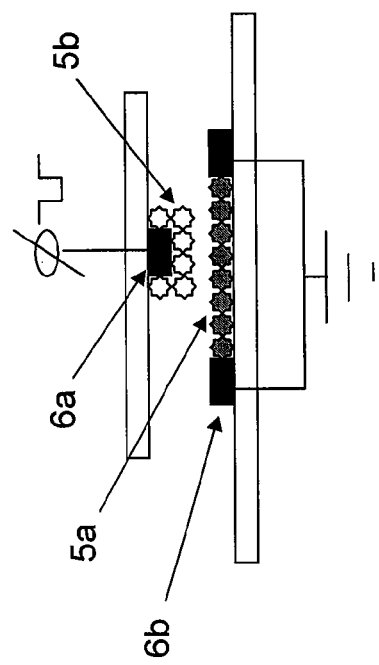

Use of oppositely charged pigments 5a, 5b with different colours allows switching between two colours in the display cell, as illustrated in the embodiments shown in FIG. 6 and FIG. 7

Turning now to FIGS. 8-10, another embodiment of the invention is illustrated schematically. The first electrode 6a is in the form of an elongate wire or fine metal line on an inner surface of the first substrate 2. The second electrode 6b is in the form of an elongate wire or fine metal line on an opposing inner surface of the second substrate 3. The second electrode 6b defines an outline of a two-dimensional shape, in this example a rectangle. The device enables bistable switching without stacking of the pigment particles 5 on flat, broad electrodes. A fringing electric field between the two electrodes 6a,6b will cover space within the rectangular area of the second electrode 6b. Consequently the dipole which provides charging of the pigment particles will also be oriented along the fringe field lines. Accordingly the pigment particles will be forced to migrate in this direction due to their interaction with the oriented LC molecules. A suitable voltage pulse provides movement of pigment particles 5 towards the top line electrode 6a (FIGS. 9b,10b) where the pigment particles are collected. Consequently the area boundary defined by the second electrode 6b will be transparent. In this example, the area defined by the second electrode 6b is rectangular in shape; however it will be understood that the area could be of any desired shape. In the light state shown in FIGS. 9b and 10b, most of the light that traverses the first substrate 2 will not encounter an electrode, thereby improving light transmissivity compared to prior art displays in which a transparent electrode is needed to attract particles to its surface. Although this aspect of the invention is illustrated with respect to areas bounded by an unbroken second electrode 6b, it will be understood that this is not essential to the working of the invention. A break (12) in the second electrode 6b (for example as illustrated in FIG. 10c) is acceptable providing that the resulting fringe field is sufficient to cause substantially all of the defined area to receive pigment particles 5 when the display is driven to the dark state.

Application of a voltage pulse with opposite polarity provides movement towards the rectangular area bounded by the second electrode 6b, where the pigment particles are spread out (FIGS. 9a,10a). By tuning the voltage pulse length and amplitude, the pigments can be stopped in the area between the top and bottom substrates along the fringe field lines. Due to the strong interaction with LC molecules, this state will be stable at zero field.

The device shown in FIGS. 11-13, the switching mechanism is essentially the same as in the device of FIGS. 8-10. The differences are that this device has a plurality of parallel first electrodes 6a opposite a single second electrode 6b which defines the boundary of a rectangle that is opposite each of the first electrodes. In this example, each electrode 6 has a width of about 5 μm. In the dark state (FIGS. 12a and 13a) the pigment particles 5 are spread out over the entire area bounded by the second electrode 6b.

Figure 14B:
FIG. 14 shows photomicrographs of the dark state and the light state of the device of FIG. 13.
Figure 14A:

FIG. 14a is a photomicrograph of the dark state (FIGS. 12a and 13a) and FIG. 14b is a photomicrograph of the light state (FIGS. 12b and 13b). The movement of pigment particles 5 is between the first (top) substrate 2 and the second (lower) substrate 3, with a cell gap of about 10 μm. Smaller cell gaps can decrease the amplitude and pulse length required.

Particle mobility (μ) was calculated as follows:

$$\mu = d^2/t\,U$$

$$d = 20\,\mu m = 2\times 10^{-3}\,cm$$

$$t = 30\text{--}50\,ms$$

$$U = 80\,V$$

$$\mu \sim 1\text{-}1.6\,10^{-6}\,cm^2/s\,V.$$

This experimental display was not optimised but achieved a contrast ratio close to 4.

Figure 15:
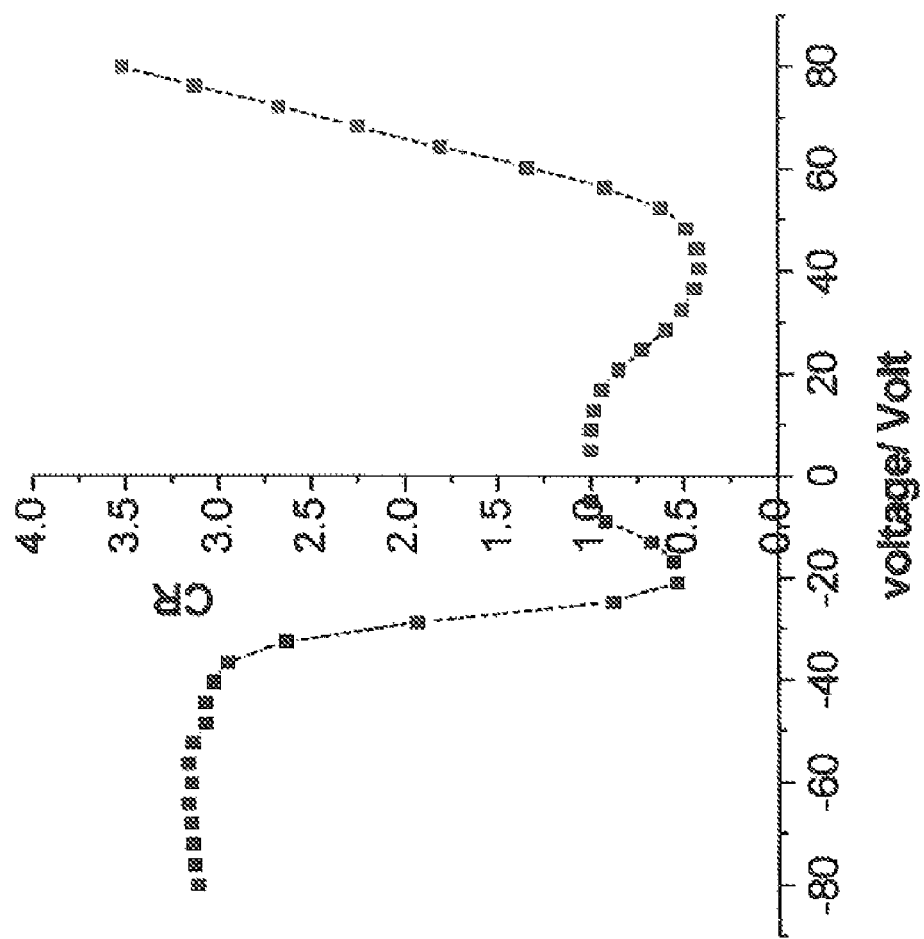
FIG. 15 is a graph of contrast ratio (CR) against applied voltage for the device of FIG. 13.

FIG. 15 shows contrast ratio versus applied voltage for the device of FIGS. 11-13 with 10 μm wide electrodes and a spacing of 20 μm. The electrophoretic medium comprised MLC-6681 LC and R700 ($TiO_2$) pigment particles. The display was driven with unipolar pulses 30 & 50 ms/80 V: 30 ms OFF-state, 50 ms ON-state. The curve shows quite good threshold characteristics, which indicates the possibility of passive matrix addressing.

Figures 16A, 16B:
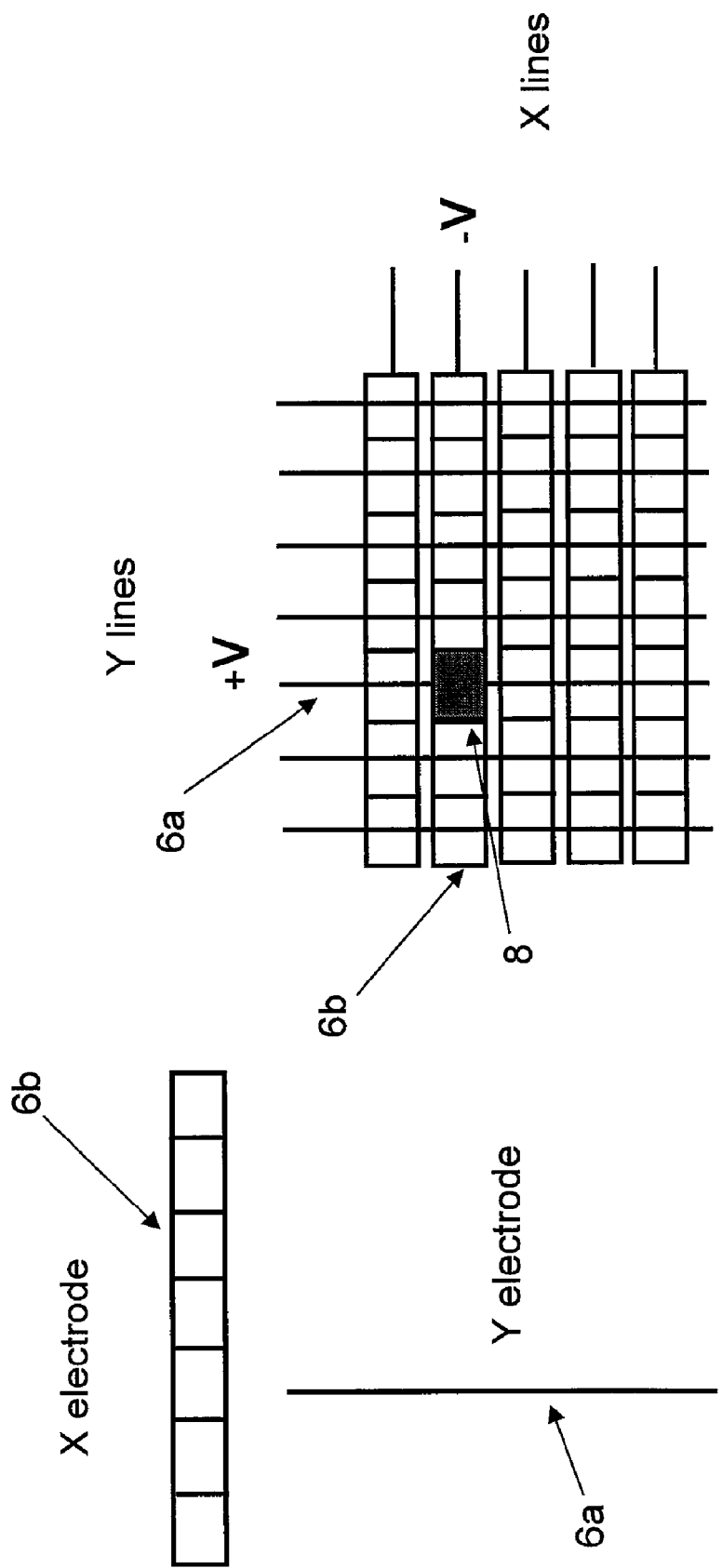
FIG. 16 illustrates a device in accordance with a seventh embodiment of the invention.

In the embodiment shown in FIG. 16, a combination of fine metal lines as first (Y) electrodes 6a and fine metal lines defining square electrodes as second (6b) electrodes is used. The display is matrix addressable, with each pixel 8 being defined by the area surrounded by a square portion of the X-electrode and overlapped by a line Y-electrode. When a suitable threshold voltage is applied between an X-electrode and a Y-electrode, the pixel 8 is bistably switched to an ON-state or an OFF-state and will remain in that state until driven to the other state by a suitable pulse of opposite polarity. The electrodes 6 occupy less than 30% of the field of view of the display and can switch substantially the remaining field of view between the ON-state and the OFF-state. The metal electrodes 6 may be very fine; they preferably occupy less than 20%, notably from 1-20%, of the field of view of the display.

Figure 17:
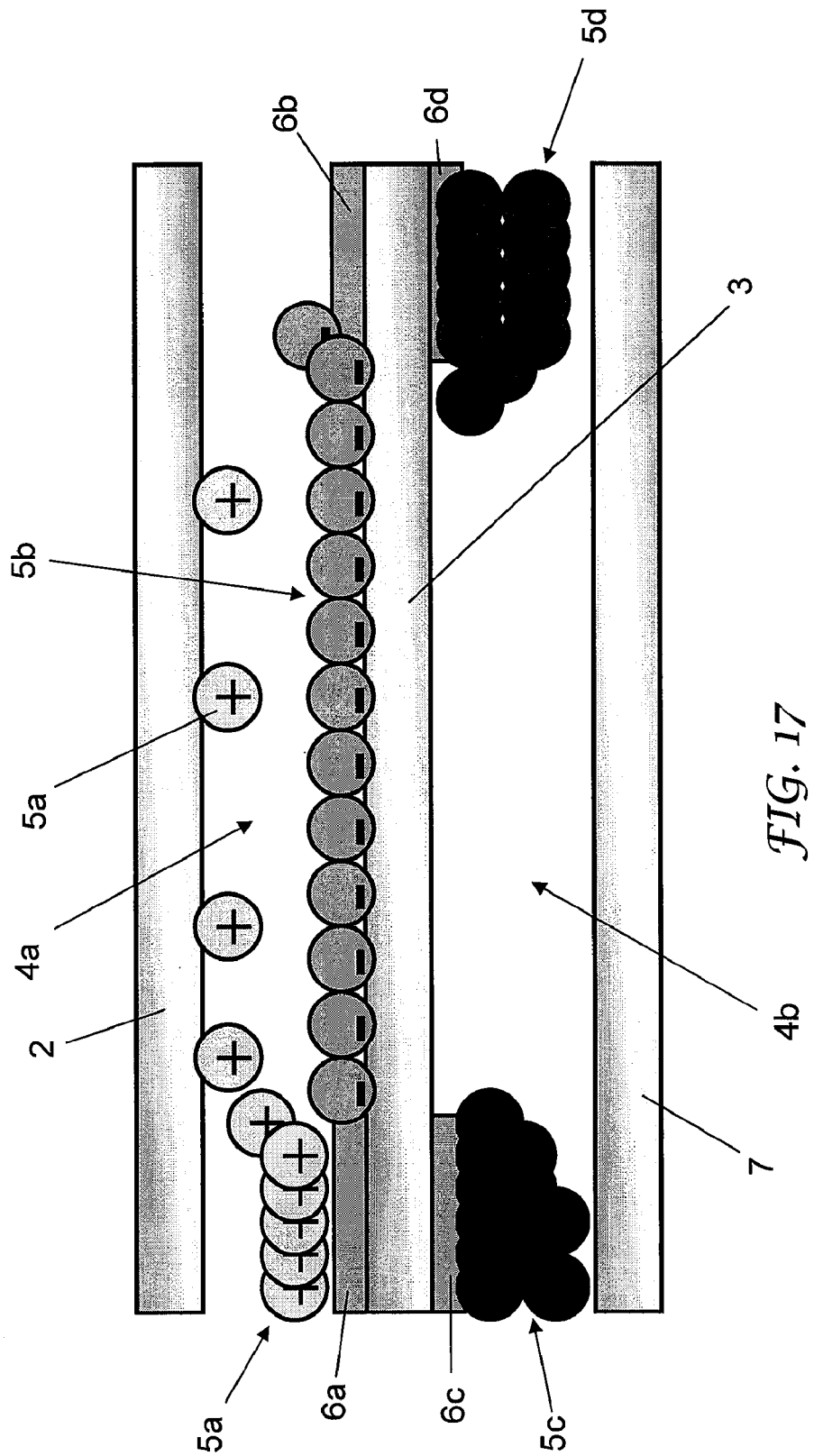
FIG. 17 is a schematic sectional view through a device in accordance with a further embodiment of the invention.

The device of FIG. 17 uses in-plane electrodes similar to the device of FIG. 3, but includes a third substrate 7, and additional electrodes 6c,6d on another surface of the second substrate 3. The electrodes are not limited to the second substrate and could also be located on the first and third substrates. By providing two layers 4a,4b of electrophoretic medium, any of four different colours or optical states may be selected for a given pixel. The first electrophoretic medium 4a has dispersed pigment particles 5a,5b of opposite charge, and the second electrophoretic medium 4b has different dispersed pigment particles 5c,5d of opposite charge to each other.

Use of magenta and cyan transparent pigment particles in the first display layer, and yellow and black pigments in the second stacked layer, permits realisation of a full colour display. The full colour display can also be built by stacking of layers with single CMY transparent colour pigment particles. It will be understood that other combinations of CMYK could be used in the two layers in addition to the CM/YK combination specifically described herein for purposes of illustration. A further example is a combination of black/magenta (KM) in the first layer and cyan/yellow (CY) in the second layer.

In the experiments we used a wide range of liquid crystals, including: MLC6681, MLC6436-000, MLC6650, MLC6204-000, MLC6639, E7, ZLI4788-000, MDA-03-4518, ZLI14792 (from Merck). As opaque pigments we used white $TiO_2$ pigments R700, R900 (Dupont), WP10S, red RP10S, yellow YP10S and black BP10S. We used transparent pigments blue Hostaperm pigment Blue B2G-D, magenta Hostaperm pigment Pink E02, yellow Novoperm pigment Yellow 4G (from Clariant). The cells are assembled by using plastic and glass substrates with specified metallic electrodes.

We have observed bistability and voltage threshold switching in devices according to the present invention, which offer the potential for full colour passive matrix addressed displays as well as 'electronic paper' applications.

The articles 'a' and 'an' are used herein to denote 'at least one' unless the context otherwise requires.

What is claimed is:

1. A multi-stable electrophoretic display device having a plurality of pixels and comprising a first substrate and a second substrate, the substrates being spaced apart from each other and enclosing a layer of an electrophoretic medium comprising a liquid crystal material having pigment particles dispersed therein; and opposing electrode lines corresponding to each of said pixels and for selectively applying an electric field across at least some of the electrophoretic medium in each pixel area; wherein said opposing electrode lines for each pixel are coplanar on said first substrate;

wherein the electrode lines effect switching between a first optical state in which said pigment particles are collected around one of two electrode lines for a pixel such that most light incident on that pixel does not impinge on a pigment particle, and a second optical state in which said pigment particles are held in a space between said two electrode lines for that pixel such that most light incident on that pixel impinges on pigment particles.

2. A device according to claim 1, wherein said electrode lines comprise first and second interdigitated electrodes provided on the first substrate.

3. A device according to claim 1, wherein said liquid crystal material has two different types of pigment particles dispersed therein, one type of which acquires a positive charge and the other type of which acquires a negative charge.

4. A device according to claim 1, wherein said electrode lines are made of metal.

5. A device according to claim 1, further comprising a third substrate spaced apart from the second substrate, and a layer of a second electrophoretic medium enclosed between the second substrate and the third substrate; and electrodes for applying an electric field across at least some of the second electrophoretic medium; the second electrophoretic medium comprising a liquid crystal material having pigment particles dispersed therein.

6. A device according to claim 5, wherein the pigment particles in one of the layers are of a different composition to the pigment particles in the other layer.

7. A device according to claim 5, wherein each of the layers has two different types of pigment particles dispersed therein, one type of which acquires a positive charge and the other type of which acquires a negative charge.

8. A device according to claim 1, wherein the electrode lines have a width of about 10 µm or less.

9. A device according to claim 1, wherein the electrode lines have a width in the range from about 1 µm to about 6 µm.

10. A device according to claim 1, wherein the electrode lines have a width in the range from about 3 µm to about 5 µm.

11. A device according to claim 1, wherein when the device is in the first optical state, most light which is transmitted through the first substrate impinges on the second substrate.

12. A device according to claim 1, wherein the pigment particles reflect or scatter light, the electrophoretic medium further includes a dissolved dye, and wherein when the device is in the first optical state most light incident on a pixel is absorbed by the dye.

13. A device according to claim 1, wherein the pigment particles selectively absorb light in a specified waveband and substantially transmit light outside the specified waveband.

14. A multi-stable electrophoretic display device having a plurality of pixels and comprising a first substrate and a second substrate, the substrates being spaced apart from each other and enclosing a layer of an electrophoretic medium comprising a liquid crystal material having pigment particles dispersed therein; and electrode lines for formation of pixels and applying an electric field across at least some of the electrophoretic medium in the pixel area;

wherein the electrode lines effect switching between a first optical state in which most light incident on a pixel does not impinge on a pigment particle, and a second optical state in which most light incident on a pixel impinges on pigment particles; and wherein the electrode lines effect switching to at least one intermediate optical state in which the pigment particles occupy more of the pixel area than when the device is in the first optical state, but the pigment particles occupy less of the pixel area than when the device is in the second optical state, providing each pixel with grayscale capability.

15. A multi-stable electrophoretic display device comprising a first substrate and a second substrate, the substrates being spaced apart from each other and enclosing a layer of an electrophoretic medium comprising a liquid crystal material having finely divided pigment particles dispersed therein; and in-plane metallic electrodes on an inner surface of the first substrate driven with different voltage signals for applying an electric field across at least some of the electrophoretic medium; wherein the electrodes occupy substantially less than the entire field of view of the display and can be used to effect switching between a first optical state in which most incident light on a pixel does not impinge on a pigment particle, and a second optical state in which most incident light on a pixel impinges on pigment particles.

16. A device according to claim 15, wherein said electrodes comprise first and second interdigitated metallic electrodes provided on the first substrate.

17. A device according to claim 15, wherein the electrodes occupy less than 30% of the field of view of the display and can switch substantially the remaining field of view not occupied by the electrodes between the first optical state and the second optical state.

18. A device according to claim 15, wherein the electrodes occupy from 1-20% of the field of view of the display.

19. A multi-stable electrophoretic display device comprising a first substrate and a second substrate, the substrates being spaced apart from each other and enclosing a layer of an electrophoretic medium comprising a liquid crystal material having pigment particles dispersed therein; and electrodes for applying an electric field across at least some of the electrophoretic medium; wherein said electrodes comprise an elongate first metal wire on an inner surface of the first substrate and an opposed second metal wire on an inner surface of the second substrate, the second wire defining an outline of a two-dimensional shape which occupies a greater area than an opposed portion of the at least one first wire; wherein the electrodes effect switching between a first optical state in which most incident light on a pixel does not impinge on a pigment particle, and a second optical state in which most incident light on a pixel impinges on pigment particles.

20. A device according to claim 19, wherein the second wire defines the outline of a substantially rectangular shape.

21. A device according to claim 19, wherein the electrodes occupy less than 30% of the field of view of the display and can switch substantially the remaining field of view not occupied by the electrodes between the first optical state and the second optical state.

22. A device according to claim 21, wherein the electrodes occupy from 1-20% of the field of view of the display.

* * * * *